United States Patent [19]

Ariyama et al.

[11] 4,454,210

[45] Jun. 12, 1984

[54] ELECTROPHOTOGRAPHIC REPRODUCTION OF A THREE-DIMENSIONAL OBJECT

[75] Inventors: Kenzo Ariyama, Yokohama; Hideo Yamazaki, Urayasu; Tamotsu Motohashi, Tokyo; Minoru Hirota, Kawasaki, all of Japan

[73] Assignee: Ricoh Company, Ltd., Japan

[21] Appl. No.: 342,471

[22] Filed: Jan. 25, 1982

[30] Foreign Application Priority Data

Jan. 24, 1981 [JP] Japan .................................. 56-9173
Mar. 20, 1981 [JP] Japan ................................ 56-40713
Mar. 20, 1981 [JP] Japan ................................ 56-40715

[51] Int. Cl.³ .......................................... G03G 13/22
[52] U.S. Cl. ...................................... 430/31; 430/22; 354/62; 354/80; 354/292; 355/7
[58] Field of Search .................... 430/31, 22; 354/292, 354/80, 62; 355/7

[56] References Cited

U.S. PATENT DOCUMENTS

2,859,352 11/1958 Sugarman ............................. 430/31
3,050,872 8/1962 Myers et al. ......................... 354/292

Primary Examiner—John D. Welsh
Attorney, Agent, or Firm—Guy W. Shoup

[57] ABSTRACT

A method and apparatus for making a two-dimensional copy from either a two-dimensional or three-dimensional object is provided. In making a two-dimensional copy from a three-dimensional object, the object is submerged in the liquid contained in a container having a transparent bottom portion to which said object is brought into contact by placing a cover member thereon. The object is then exposed through the transparent bottom portion thereby the projected image of the object viewed through the transparent bottom portion is reproduced on a sheet of copy paper.

5 Claims, 19 Drawing Figures

ELECTROPHOTOGRAPHIC REPRODUCTION OF A THREE-DIMENSIONAL OBJECT

BACKGROUND OF THE INVENTION

1. Field of the Invention

This invention relates in general to electrophotographic reproduction and more in particular to an electrophotographic reproduction method and apparatus which is capable of making two-dimensional copies of a three-dimensional object.

2. Description of the Prior Art

Prior art electrophotographic copying machines are usually built to make two-dimensional copies from a two-dimensional original such as a book or sheet of paper. In such prior art copying machines, in-focus conditions are satisfied when a two-dimensional original is properly placed on the top surface of the contact glass plate. However, since the optical system of the prior art copying machines usually has a limited or shallow field of depth, they are not suited for making two-dimensional copies of a three-dimensional object, i.e., making a copy of the projected image viewed in one direction of a three-dimensional object on a sheet of copy paper.

It has often been required to make two-dimensional copies of a three-dimensional object. For example, in a surgical operation, autopsy and the like, internal organs removed from the patient or dead body are preserved as specimens in spirits at least partly. However, more often than not, photographic pictures of the removed organs are taken with the use of a special photographic device for internal organs so that the pictures may be filed together with related medical certificates or reports.

It is true that such a special photographic device is equipped with means for adjusting the field of depth of its lens in multiple steps by maneuvering its optical system. However, such means for adjusting the field of depth is rather complicated in structure and thus it tends to be expensive as well as unreliable. Moreover, such a prior art device requires a relatively long period of time for processing such as developing and printing, and its result cannot be checked on the spot. If a required portion has been found to be insufficiently photographed, rephotographing can be made only with difficulty and insufficiency. In certain circumstances, rephotographing is impossible or meaningless because of the decay or disposal of the removed organ in question.

It should further be noted that the image on a photographic picture is usually reduced in size and it may be too small to examine certain parts of the photographed object. Besides, difficulties are often encountered in recognizing the actual size of the photographed object. Such a picture is disadvantageous because notes cannot be written thereon. Another disadvantage is that its usage is rather limited and therefore there are many occasions where such a special photographic device is not applicable, though it is an expensive device.

SUMMARY OF THE INVENTION

In accordance with one aspect of the present invention, there is provided an electrophotographic method for making a two-dimensional copy of a three-dimensional object, said method comprising the steps of: immersing said object into a transparent liquid contained in a container having a transparent bottom plate; placing a cover member having a white bottom surface on said object thereby bringing said object partly in contact with said bottom plate, any part of the bottom surface of said cover member being under the water surface of said liquid; and exposing said object through said transparent bottom plate to a photosensitive member in order to apply a series of electrophotographic process steps to said photosensitive member to obtain a two-dimensional copy image of said three-dimensional object.

In accordance with another aspect of the present invention, there is provided a container for containing therein a three-dimensional object in order to make a two-dimensional copy thereof, said container comprising a bottom having a transparent portion to which said object is to be brought into contact, a sidewall extending upward from the periphery of said bottom and having an inner reflecting surface, first fastening means fixedly mounted on said bottom or sidewall, a flexible cover member having a reflecting surface and second fastening means engageable with said first fastening means whereby said object is set in position in contact with said transparent portion by said cover member when said first and second fastening means are brought into engagement.

In accordance with a further aspect of the present invention, there is provided an electrophotographic copying machine having a normal copy mode in which two-dimensional copies are made from a two-dimensional original as usual and a three-dimensional copy mode in which two-dimensional copies are made from a three-dimensional object, said copying machine comprising a photosensitive member; image forming means including charging means for charging the surface of said photosensitive member, exposure means for exposing the thus charged photosensitive member to said two-dimensional original or the projected image of said three-dimensional object to form an electrostatic latent image, and developing means for developing said latent image thereby converting into a visual image; and switching means for switching between said normal copy mode and three-dimensional copy mode, said switching means changing the conditions of at least one of said image forming means when the modes are switched.

There is also provided an electrophotographic copying machine capable of making a two-dimensional copy either from a two-dimensional or three-dimensional object comprising holder means defining a holding surface on which said object may be placed; a photosensitive member; an optical system for leading the light reflected from said object to the surface of said photosensitive member, said optical system including adjusting means for adjusting to hold the conjugate image forming relation between said holding surface and the surface of said photosensitive member and between a point located above said holding surface and the surface of said photosensitive member; and electrophotographic processing means including charging means and developing means to be applied to said photosensitive member in forming an image thereon.

It is therefore an object of the present invention to provide a process and apparatus capable of making two-dimensional copies from either a two-dimensional or three-dimensional object.

Another object of the present invention is to provide a process and apparatus capable of obtaining the projected image viewed in one direction of an internal organ of an animal including a human being, dead or alive, on a sheet of paper.

A further object of the present invention is to provide a container for containing therein a three-dimensional object such as an internal organ from which a two-dimensional copy is to be made.

A still further object of the present invention is to provide an electrophotographic copying machine which has a normal mode in which two-dimensional copies are made from a two-dimensional original and a three-dimensional copy mode in which two-dimensional copies are made from a three-dimensional object.

Other objects, advantages and novel features of the present invention will become apparent from the following detailed description of the invention when considered in conjunction with the accompanying drawings.

DESCRIPTION OF THE PREFERRED EMBODIMENTS

Figure 1:
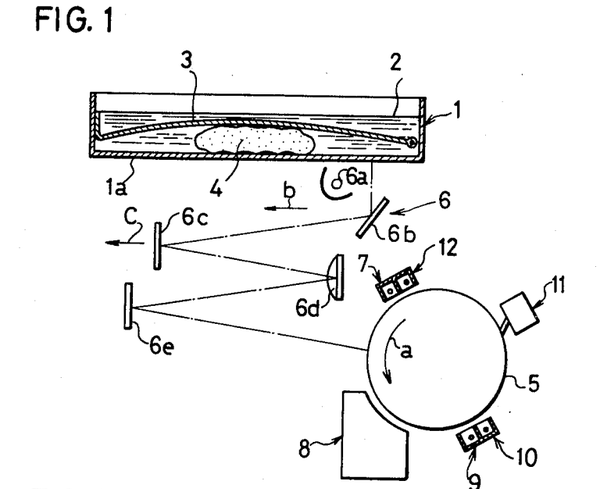
FIG. 1 is a schematic illustration showing one embodiment of the present invention.

Referring now to FIG. 1, there is schematically shown an electrophotographic copying machine which includes a container 1 having a transparent bottom plate 1a. A quantity of transparent liquid 2 such as water and formalin is contained in the container 1. Pivotally provided is a cover member 3 which is preferably comprised of a synthetic resin and has a bottom surface white in color.

A three-dimensional object 4, such as an internal organ, from which a copy is to be made is placed as submerged in the liquid 2 inside the container 1. The object 4 is in light pressure contact with the bottom plate 1a because of the weight of the cover member 3. It is to be noted that the cover member 3 or at least any part of its bottom surface must be submerged in the liquid 2. The cover member 3 is not necessarily flexible, but it is preferable to be flexible particularly in the case when the object 4 is irregular in shape.

Disposed below the container 1 is a photosensitive drum 5 which is driven to rotate in the direction indicated by the arrow a at a constant speed V. Desposed between the container 1 and the drum 5 is an exposure system 6 which includes an illumination lamp 6a, a first travelling mirror 6b, a second travelling mirror 6c, an in-mirror lens 6d and a fourth mirror 6e. The light reflected from the object 4 impinges upon the surface of the drum 5 at the exposure position as reflected by the mirror 6b, mirror 6c, lens 6d and mirror 6e in the order mentioned. It is to be noted that the first travelling mirror 6b together with the lamp 6a is movable in the direction indicated by the arrow b or its reverse direction. Likewise, the second travelling mirror 6c is movable in the direction indicated by the arrow c or its reverse direction. When the first travelling mirror 6b together with the lamp 6a moves in the direction indicated by the arrow b with speed V, the second travelling mirror 6c moves in the direction c, which is the same as the direction b, with speed V/2 synchronously. In this manner, slit scanning of the object 4 can be carried out.

Disposed along the peripheral surface of the photosensitive drum 5 are a charging device 7, a developing device 8, a transferring device 9, a separating device 10, a cleaning device 11 and a discharging device 12. Thus, as the drum 5 rotates, the peripheral surface of the drum 5 is uniformly charged by the charger 7 and then the thus charged surface is exposed to a light image from the object 4 to form an electrostatic latent image. Then, the latent image is developed by the developing device 8 to form a toner image which is then transferred to a transfer medium with the aid of the transferring device 9. The transfer medium is then separated from the drum 5 to be transported to a desired place; whereas, the drum 5 is subjected to the cleaning operation by the cleaning device 11 to remove any residual toner. Thereafter, the drum 5 is discharged by the discharging device 12 thereby preparing for a next cycle of copying operation.

Figure 2:
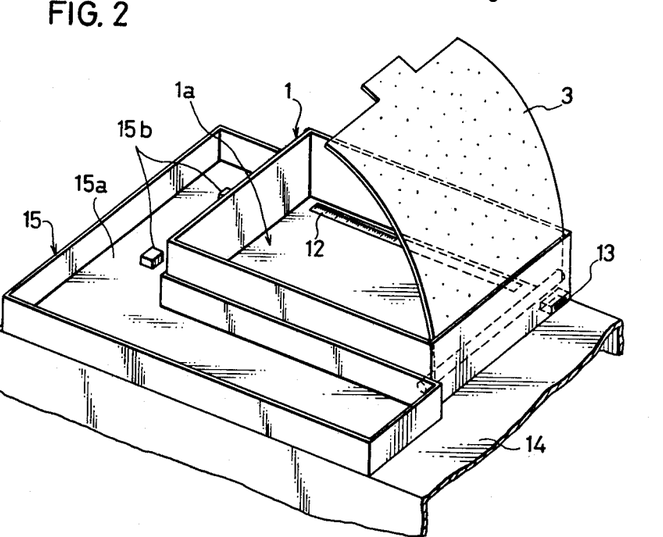
FIG. 2 is a perspective view showing one form of the container for containing therein a three-dimensional object such as an internal organ from which a two-dimensional copy is to be made.

As shown in FIG. 2, a scale 12 is provided on the bottom plate 1a along its one side. A slot 13 is formed at one corner of the container 1 and thus an insert with words or numbers identifying the object 4 may be slipped into the slot 13. As shown, the container 1 is mounted on the housing 14 of the copying machine and a liquid receiver 15 generally in the shape of a letter "L" is also mounted on the housing 14 with two sidewalls in contact with the corresponding sidewalls of the container 1. The liquid receiver 15 is provided to receive dripping liquid droplets when the object 4 is moved in or out of the container 1 thereby preventing the liquid from getting inside of the copying machine. The liquid receiver 15 has a bottom plate 15b which is provided with a pair of recesses 15b, 15b. On the other hand, the housing 14 is provided with a pair of projections (not shown) which may be fitted into the corresponding recesses thereby placing the liquid receiver 15 in position. It should be noted that the container 1 may be placed on the contact glass, which forms a holder for holding thereon an original, of the copying machine.

With the structure described above, a clear projected image of the three-dimensional object 4 can be obtained on a sheet of copy paper. The refractive index of the liquid 2 is larger than that of the air, the field of depth of the lens system becomes effectively deeper and the rate of reflection of the illuminating light increases. It is believed that this allows to obtain a clear two-dimensional copy of a three-dimensional object.

Figure 3:
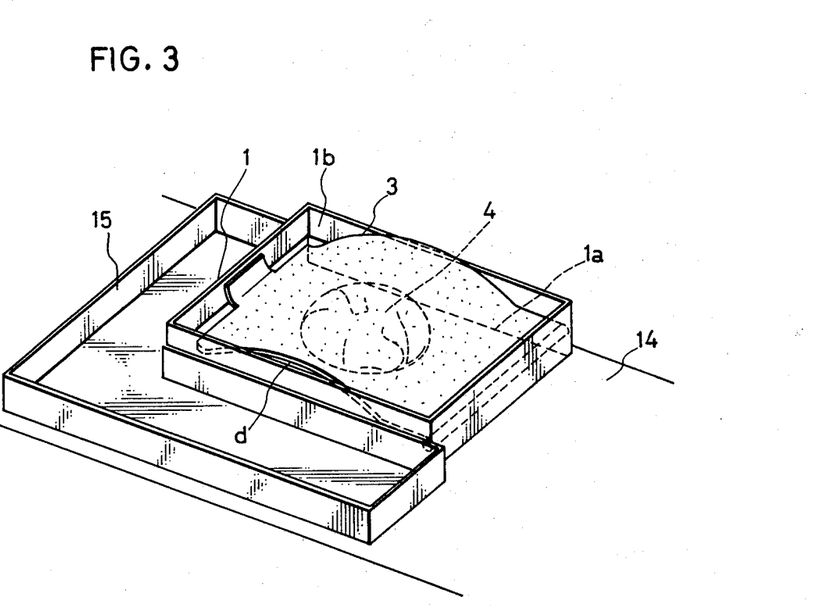
FIG. 3 is a perspective view showing the container of FIG. 2 in use with a part of the cover member appearing above the height of the sidewall.
Figure 4:
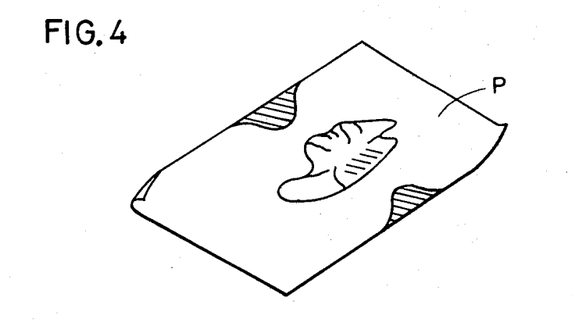
FIG. 4 is a schematic illustration showing a sheet of copy paper which is obtained by carrying out a reproduction process with the condition shown in FIG. 3.

As shown in FIG. 3, if the internal organ 4 is rather large, there will be formed a gap d between the cover member 3 and the sidewall 1b, thereby allowing leakage of the illuminating light. If a copy is produced under such condition, "black" areas will appear on a copy sheet P as shown in FIG. 4. Moreover, if the internal organ 4 has a relatively large buoyancy, the operator must lightly press the cover member 3 down to keep the internal organ 4 in contact with the bottom plate 1a with his or her hand.

Figure 5A:
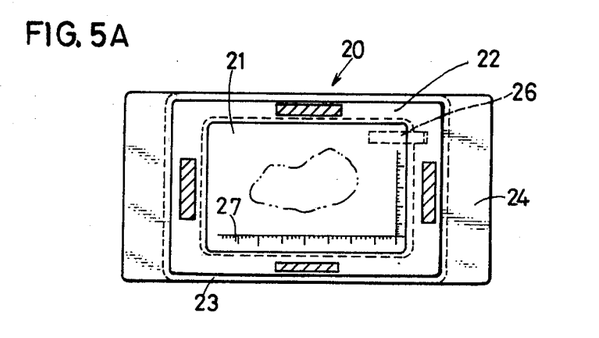
FIG. 5(A) is a top plan view showing another form of the container.
Figure 5B:
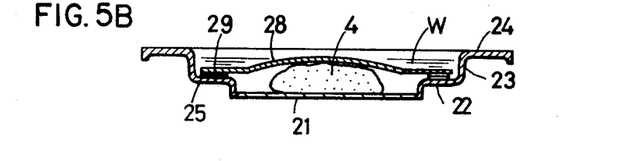
FIG. 5(B) is a cross-sectional view of the container shown in FIG. 5(A)
Figure 6:
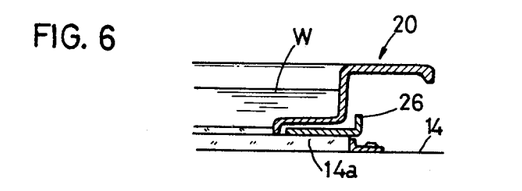
FIG. 6 is a fragmentary view showing a part of the container on an enlarged scale shown in FIG. 5(A)
Figure 7:
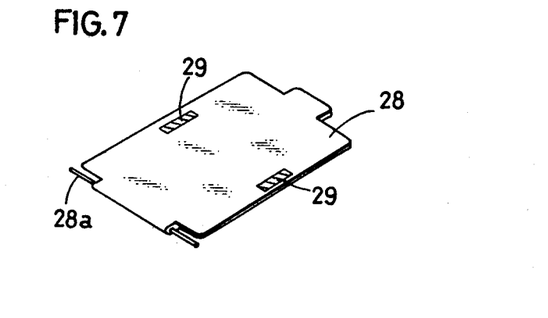
FIG. 7 is a perspective view showing an alternative example of the cover member forming a part of the container shown in FIG. 5(A)

In view of the above, FIGS. 5 through 7 illustrate an improved container 20 for placing therein the internal organ 4 from which a two-dimensional projected image is to be formed on a sheet of copy paper. As shown, the container 20 includes a transparent bottom plate 21 which may be placed in contact with the contact glass 14a mounted on the copy machine housing 14. The container 20 also includes a raised bottom portion 22 formed around the bottom plate 21 as raised approximately by 20 mm, a sidewall 23 extending upward from the outer periphery of the raised bottom portion 22 and a pair of holders 24 extending oppositely in the outward direction from the sidewall 23. The container 20 is integrally formed by a material which is "white" in color in order to have an excellent reflecting surface except the bottom plate 21.

A cover member 28 is preferably made of a flexible material such as rubber and synthetic resin, and it is placed on the internal organ 4 to bring it into a light pressure contact with the bottom plate 21. For example, the cover member 28 may be made from a sponge material with its one surface spread with white rubber and then vulcanized. The cover member 28 may also be made from other materials, but it is preferably of 0.5 to 4.0 mm thick. The cover member 28 has such a size that it may be fitted into the container 20 with its side portions riding on the corresponding raised bottom portions 22. The cover member 28 is provided with four fastening devices 29 one for each side. Similarly, four fastening devices 25 are attached to the raised bottom portions 22. After placing the cover member 28, the fastening devices 29 may be pressed into engagement with the respective fastening devices 25 by fingers so that the cover member 28 and thus the internal organ 4 may be held in position. The engagement between the fastening devices 25 and 29 is such that they may be easily disengaged by pulling the cover member 28 outwardly by fingers. Also provided is a detachable memo plate 26 on which may be written desired items such as date and I.D. number. Besides, a scale 27 is provided on the bottom plate 21.

In use, a quantity of transparent liquid W such as water is poured into the tray-like container 20 placed on the contact glass 14a of the copying machine, and then the internal organ 4 from which a projected image to be obtained is submerged in the liquid W. In turn, one of the fastening devices 29 attached to the cover member 28 is pressed into engagement with the corresponding fastening device 25 attached to the raised bottom portion 22. Then, the cover member 28 is spread to cover the internal organ 4 and that fastening device 29 opposite to the fastening device 29 already fastened is pressed into engagement with the corresponding fastening device 25 on the raised bottom portion 22 as somewhat pulling the cover member 28 toward the fastening devices which are going to be fastened together, thereby imparting a light pressure onto the internal organ 4 against the bottom plate 21. Thereafter, the remaining fastening devices are pressed into engagement. With such a structure, the internal organ 4 may be held in position properly and there is no likelihood of occurring leakage of the illuminating light passing through the transparent bottom plate 21 because of the overlap between the cover member 28 and the raised bottom portion 22. Upon completion of reproduction, the cover member 28 may be easily removed just by pulling in the upward direction for washing or cleaning.

FIG. 7 shows a modification of the cover member 28, in which only a pair of fastening devices 29, 29 is provided oppositely along the longer sides because these are the sides which are more likely to leak the illuminating light. One end or shorter side of the cover member 28 shown in FIG. 7 is provided with a pair of pins 28a which may be temporarily engaged with the correspondingly formed portions of the container 20. However, such pins 28a may be omitted because the shorter sides tend to properly come into contact with the raised bottom portion 22 by their own weight. It should also be noted that any conventional fastening devices may be appropriately selected for use for the purpose of the present invention.

Figure 8:
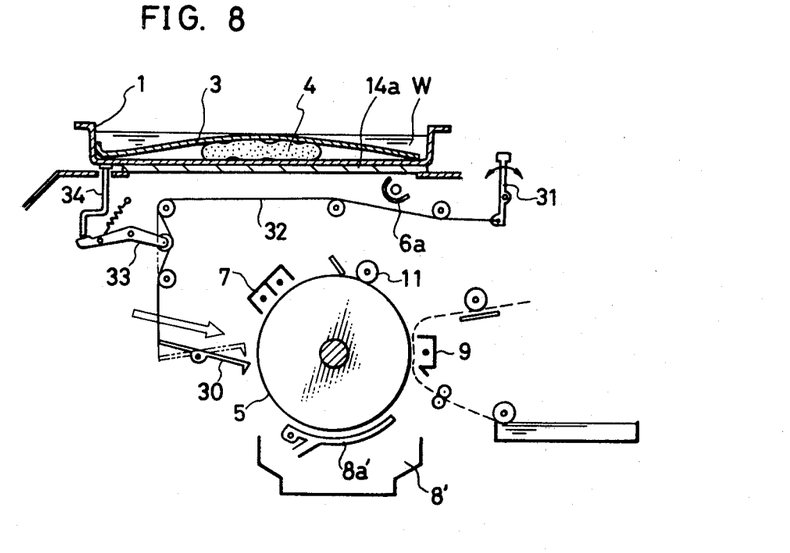
FIG. 8 is a schematic illustration showing another embodiment of the present invention which particularly illustrates the switching mechanism between the normal copy mode and the three-dimensional copy mode.

FIG. 8 shows the electrophotographic copying machine having a switching mechanism between the normal copy mode, in which a two-dimensional copy is produced from a two-dimensional original, and the three-dimensional copy mode, in which a two-dimensional copy is produced from a three-dimensional original. It is to be noted that like numerals indicate like elements as practiced throughout this specification. As noticed, the structure of FIG. 8 is similar to the structure of FIG. 1. However, as shown in FIG. 8, there is newly provided an aperture plate 30 which is pivoted at the exposure position and, as is well known, connected to a density adjusting knob 31 disposed at an appropriate position of the copying machine through a wire 32.

As will be described below, however, the aperture plate 30 is also controlled by the mode switching mechanism of the present invention.

Figure 9:
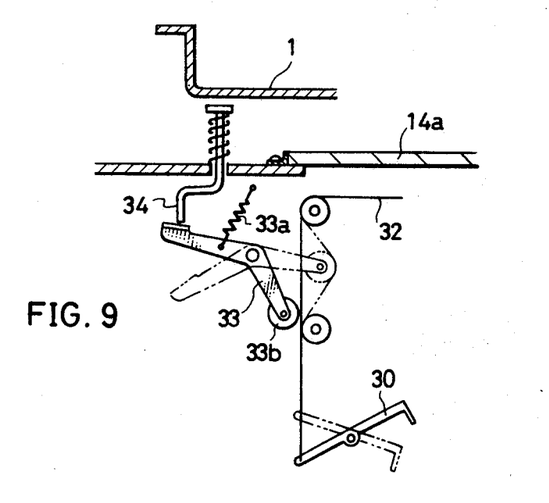
FIG. 9 is a schematic illustration showing on an enlarged scale a part of the structure shown in FIG. 8.

FIG. 9 shows the detailed structure of one embodiment of the present mode switching mechanism. As shown, a switching lever 33 in the shape of a bell crank is pivotally supported in the neighborhood of the wire 32 extended between the aperture plate 30 and the density adjusting knob 31. Due to the recovery force of a coil spring 33a, the switching lever 33 normally takes the inoperative position indicated by the solid line where the lever 33 stays away from the wire 32. However, when the container 1 is placed in position, an actuating lever 34 is pressed downward so that the switching lever 33 is pivoted counterclockwise against the force of the spring 33a through engagement with the bottom end of the actuating lever 34 to take the operative position, as indicated by the two-dotted line, where a pulley 33b rotatably supported at the forward end of the switching lever 33 pushes the wire 32 to the right. As a result, the aperture plate 30 is pivoted clockwise to take the wide-open position indicated by the two-dotted line so that a larger amount of light may impinge upon the photosensitive drum 5.

Figures 10, 11, 12:
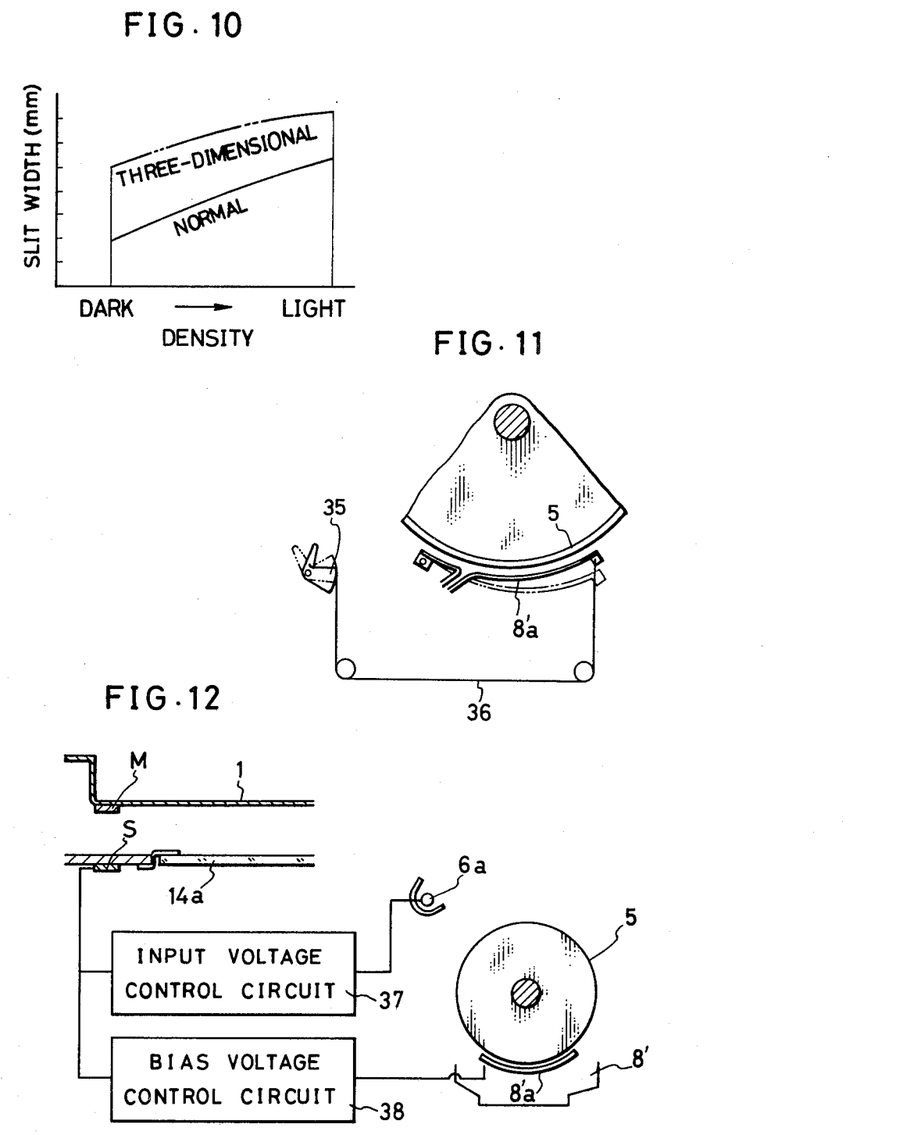
FIG. 10 is a graph showing the relationship between density and slit width for the normal and three-dimensional copy modes.
FIG. 11 is a schematic illustration showing the structure in which provision is made of the developing electrode movable between two positions depending upon the mode of operation, normal or three-dimensional, in accordance with the present invention.
FIG. 12 is a schematic illustration showing the structure in which the levels of voltages applied to the exposure lamp and the developing electrode are changed depending upon the mode of operation, normal or three-dimensional, in accordance with the present invention.

Returning to FIG. 8, disposed below the photosensitive drum 5 is a liquid developing device 8' which includes a developing plate 8a' constituting a counter electrode. As best shown in FIG. 11, the developing electrode 8a' is pivotally supported and its one end is connected to an adjusting knob 35 disposed at an appropriate position of the copying machine through a wire 36. Thus, the gap between the drum 5 and the developing electrode 8a' may be appropriately adjusted.

In operation, a quantity of transparent liquid W such as water and formalin is poured into the container 1 and the internal organ 4 removed from the body of the patient is put into the liquid W inside the container 1. Then, the container 1 is placed on the contact glass 14a thereby the actuating lever 34 is pressed downward to pivot the switching lever 33 counterclockwise so that the aperture plate 30 is pivoted clockwise to widen the slit width. In general, in the case of a three-dimensional object, from which an area image will be obtained on a sheet of copy paper, the amount of reflected light will be smaller than that of a document which mainly includes line images. Therefore, the above-described operation, in effect, is to compensate the amount of light incident upon the drum 5 in the three-dimensional copy mode.

Under the circumstances, the density adjusting knob 31 may be manually operated to further adjust the position or slit width of the aperture plate 30 in accordance with the color or other conditions of the internal organ 4. The image density may be additionally controlled by adjusting the slit width as shown by the two-dotted curve in FIG. 10. Then, the cover member 3 is placed upon the internal organ 4 to bring it into contact with the transparent bottom plate. Then a copy start button may be depressed to start a copying cycle so that the lamp 6a travels horizontally and its reflected light impinges upon the photosensitive drum 5 through an optical system (not shown) thereby the projected image of the internal organ 4 as viewed from the bottom is electrostatically formed on the photosensitive drum 5 as a latent image. Such a latent image is then developed by the liquid developing device 8' so that a developed image of excellent tone representation without edge effects may be obtained due to the contributions from the electrophoretic function characteristic of the liquid developing technique and the bias voltage applied to the developing electrode 8a'. Then, the thus developed image is transferred to a sheet of copy paper.

If it is to be used as a part of the medical certificate, a copy image must faithfully and clearly indicate even wrinkles on the surface or an ailing part of the internal organ. In such a case, the adjusting knob 35 shown in FIG. 11 should be operated to move the developing electrode 8a' in the direction away from the drum 5 to decrease the strength of the field formed by the bias voltage applied to the developing electrode and acting on the drum surface thereby allowing to reproduce the required items clearly on a sheet of copy paper. It is to be noted that it may be so structured to automatically position the developing electrode 8a' at a required position similarly with the density adjusting mechanism described previously.

FIG. 12 shows another embodiment of the present invention. As shown, a magnet M is fixedly mounted on the container 1 and a magnet-operated lead switch S is mounted on the copying machine at such position where the switch is closed when the container 1 is placed on the contact glass 14a in position. When the switch S is closed, a larger voltage than the normal copy mode is applied to the illumination lamp 6a through an input voltage control circuit 37 and at the same time a lower voltage than the normal copy mode is applied to the developing electrode 8a' through a bias voltage control circuit 38. However, depending upon the three-dimensional object from which a projected image to be formed on a sheet of copy paper, either one of the circuits 37 and 38 may be omitted, or either one or both of them may be constructed for manual operation.

In general, the optical system of a copying machine is structured such that its focal point coincides with the top surface of the contact glass plate. Thus, by placing the surface of an original in contact with the top surface of the contact glass plate, a clear copy image may be obtained. For this reason, anything such as a three-dimensional object having portions which cannot be brought into contact with the top surface of the contact glass cannot be properly shown on a sheet of copy paper produced. This is particularly true for such cases as bossed gears, cams, levers of irregular shape, printed circuit boads mounted with components, ores, biological samples, fish and internal organs contained in a transparent container.

In the case of a copying machine which employs the lens of F=8, if the magnification ratio $\beta=1$ and the practically allowable resolving power $\delta$ or diameter of minimum distraction circle is equal to 0.1, the field of depth d under the conditions may be calculated from the equation $$d = \pm F(1+\beta)\delta$$

to be ±1.6 mm. Accordingly, if it is so adjusted that the sharpest image may be obtained at the top surface of the contact glass plate, it is true that the field of depth in the order of 1.6 mm above the top plate may be obtained. However, the field of depth of this order is not sufficient for most of the items of interest, some of which are raised above. In addition, in the case of a copying machine which employs a lighter lens such as F=4.5 to 4 as in the recent high-speed copiers, the field of depth is shallower, which makes it even more difficult to the application for a three-dimensional object. If the field of depth is forcibly made larger by setting a smaller lens stop, it is then required to increase the level of illumination so as to make up for the loss of light amount, which, in turn, could bring about another problem such as excessive heating and large power consumption.

In view of the above, the present invention provides a copying machine capable of showing those portions of a three-dimensional object that cannot be brought into contact with the top surface of the contact glass plate on a sheet of copy paper produced with excellent clarity.

Figure 13:
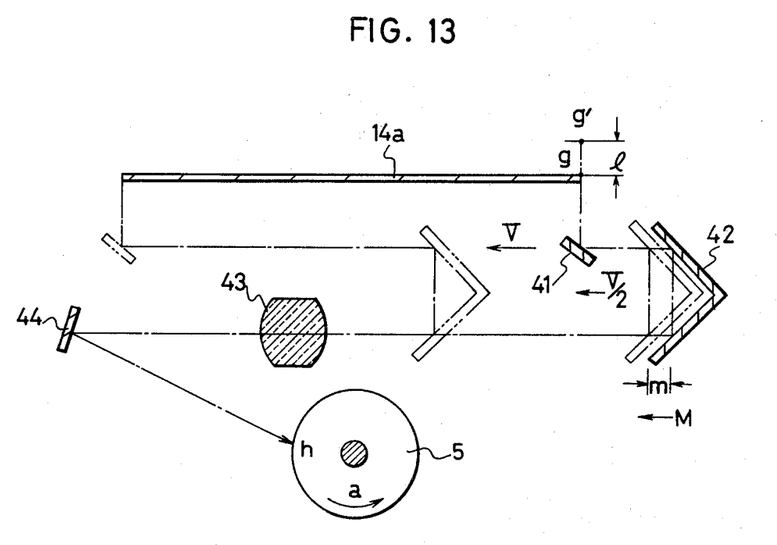
FIG. 13 is a schematic illustration showing one embodiment of the present invention having an adjustable optical system.

FIG. 13 shows one embodiment of the present invention and it includes a first travelling mirror 41 which moves as a unit with an illumination lamp along and in parallel with the contact glass plate 14a thereby slit-scanning the original surface located on the plate 14a or the original surface located above at a distance l separated from the top surface of the plate 14a. Also provided is a second travelling mirror 42 which is a combined structure of a pair of mirrors arranged perpendicular to each other. The reflected light coming from the first travelling mirror 41 is redirected by the second travelling mirror 42 to impinge upon the photosensitive drum 5 after passing through a lens 43 and reflection by a fixed mirror 44.

As well known in the art, the first and second travelling mirrors 41 and 42 are driven to move with the velocities V and V/2, respectively. In the present embodiment, the mounting position of the second mirror 42 may be shifted. For example, if a point of interest is located at a distance l above the contact glass plate 14a, the mounting position of the second mirror 42 is shifted to the left over a distance l/2 from the normal position. By so doing, the optical length from a point g on the top surface of the contact glass plate 14a to a point h on the peripheral surface of the drum 5 is maintained equal to the optical length from a point g'. separated from the top surface of the contact glass plate 14a over a distance l and the point h on the drum 5. Thus, the focal point has been moved to the point g'.

Figure 14:
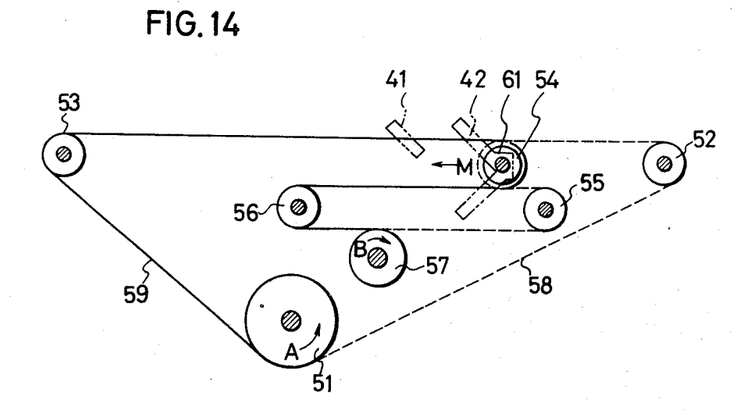
FIG. 14 is a schematic illustration showing a driving system for moving the mirrors 41 and 42 shown in FIG. 13.

FIG. 14 shows a driving mechanism for the first and second mirrors 41 and 42 and a position control mechanism for the second mirror 42. There is provided a driving pulley 51 which may be coupled to the driving shaft of the photosensitive drum 5 through an electromagnetic clutch. To the pulley 51, one end of each of a pair of wires 58 (dotted line) and 59 (solid line) is fixed. The wire 58 extends to the right from the pulley 51 in FIG. 14 and its the other end is fixed to a shift control pulley 57 after passing around an idler pulley 52, a pulley 54 rotatably supported on a carriage for carrying the second mirror 42 and an idler pulley 55. On the other hand, the other wire 59 extends to the left from the pulley 51 in FIG. 14 and its the other end is fixed to the shift control pulley 57 after passing around an idler pulley 53, the pulley 54 and an idler pulley 56. All of these pulleys are fixed in position and usually rotatably mounted on the machine housing except the pulley 54 which is reciprocatingly movable with respect to the other. The pulleys 55 and 56 are located approximately at two end positions of the reciprocating movement of the second mirror 42 or its carriage (not shown). The shift control pulley 57 is driven to rotate by means of a stepping motor thereby controlling the amount of shift in position of the second mirror 42 with respect to the first mirror 41, which is fixed to a certain point of the wire 59.

In operation, in the normal copy mode, the shift control pulley 57 stays at its predetermined angular position and the second mirror 42 takes the position indicated by the solid line in FIG. 13. Under the condition, when the driving pulley 51 rotates in the direction indicated by the arrow A, the first mirror 41 moves to the left in the drawings along the scanning path with the peripheral velocity of the driving pulley 51 through the wire 59; on the other hand, the second mirror 42 also moves to the left but with the velocity a half of the peripheral velocity of the driving pulley 51 so that the required operation of the optical system is carried out. If it is desired to focus at a point located above the top surface of the contact glass plate 14a, the shift control pulley 57 is rotated in the direction indicated by the arrow B over a required angle while the driving pulley 51 is not in motion. This causes the second mirror 42 to be shifted in the direction indicated by the arrow M over a distance a half of the amount of movement of a point on the periphery of the shift control pulley 57 so that the second mirror 42 is brought closer to the first mirror 41 which stays still thus far. Accordingly, if it is structured such that shift control pulley 57 has a radius D and rotates by 1/800 of one complete rotation per step of the stepping motor, the amount of shift of the second mirror 42 is $\pi D/800$ thereby allowing to shift the second mirror 42 to a desired position accurately by counting the number of pulses. Under the circumstances, when the optical system is operated in the manner described previously, a point of interest located above the contact glass plate 14a may be clearly shown on a sheet of copy paper.

Figure 15:
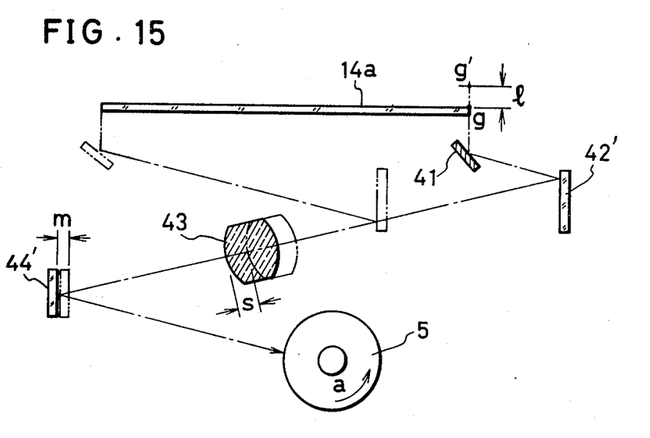
FIG. 15 is a schematic illustration showing another embodiment of the present invention having an adjustable optical system.

FIG. 15 shows another embodiment of the present invention in which the passing-through type lens 43 is provided to be shiftable to the right along the optical axis and the mirror 44' is also shiftable to the right in an associated manner. If the distance l between a point of interest g' and the top surface of the contact glass plate 14a is relatively small, the shift amount s of the lens 43 and the shift amount m of the mirror 44' in order to satisfy the in-focus condition at g' may be approximated by $s \approx l$ and $m \approx l/2$.

Figure 16:
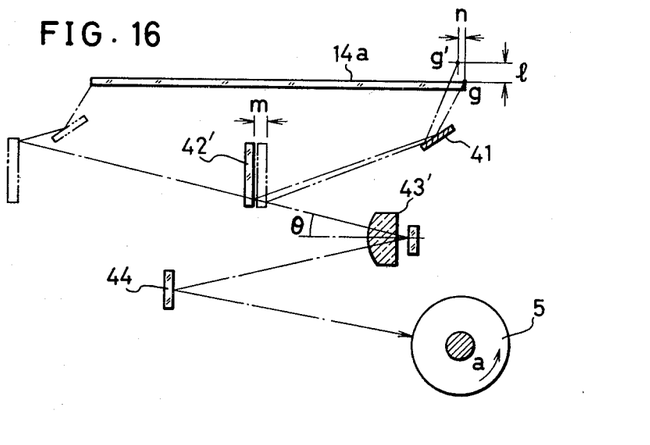
FIG. 16 is a schematic illustration showing a further embodiment of the present invention having an adjustable optical system.

FIG. 16 shows a further embodiment of the present invention which is structually similar to that shown in FIGS. 13 and 14. In this embodiment, however, use is made of a reflecting type lens 43' instead of the passing-through type lens 43 thereby allowing to make the whole device compact in size and to add the magnifying and/or reducing function in the size of a reproduced image. In this embodiment, since the second mirror 42' must be shifted in the direction perpendicular to the reflecting surface of the lens 43', the focal point g' at a distance l separated from the top surface of the contact glass plate 14a is moved over a distance n in the forward direction of the scanning path. Assuming that the optical axis of the lens 43 is in parallel with the top surface of the contact glass plate 14a and defining an angle $\theta$ between the optical axis of the lens 43' and the optical path, such a discrepancy n may be expressed as follows:

$$n = (\sqrt{2}/2 - \tan \theta)$$

where the fact that the first mirror 41 meets at 45° with the top surface of the contact glass plate 14a has been taken into account. For example, if l=10 mm and $\theta = 15°$, then the discrepancy n=4.4 mm. The existence of such a discrepancy indicates the existence of discrepancy in the image forming position on the photosensitive drum 5. Therefore, in this embodiment, the timing of operation of the optical system must be made faster with respect to the rotational velocity of the drum 5, or the timing of supplying a copy paper to the drum 5 must be delayed to compensate for the discrepancy n.

Figure 17:
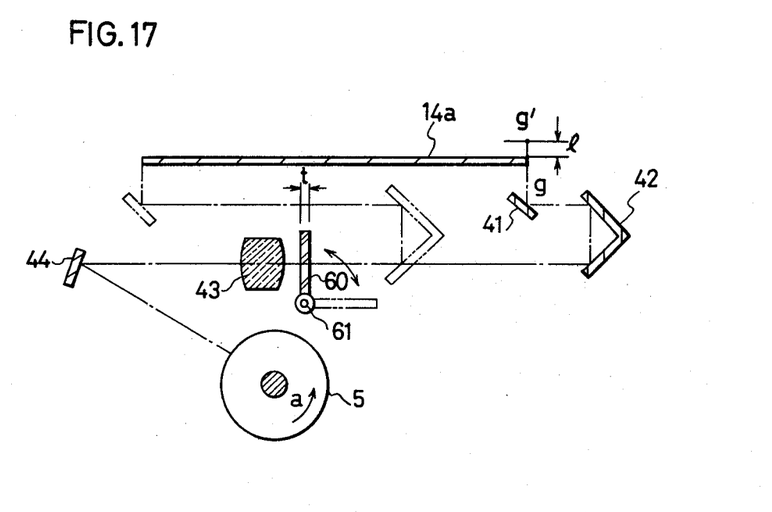
FIG. 17 is a schematic illustration showing a still further embodiment of the present invention having an adjustable optical system.

FIG. 17 shows a further embodiment of the present invention in which a glass plate 60 is provided to be insertable in the optical path between the lens 43 and the contact glass plate 14a to change the position of the focal point. As shown, the glass plate 60 is fixedly mounted on a rotatable shaft 61 which may be rotated by a motor (not shown) or a solenoid (not shown) as required. Thus, by rotating the shaft 61 over a predetermined angle, the glass plate 60 may be moved between the operative position in the optical path and the inoperative position out of the optical path.

It is to be noted that the distance l between the point of interest g' and the top surface of the contact glass plate 14a is the shortest when the glass plate 60 is held perpendicular to the optical axis. Under the condition, denoting the refractive index of the glass plate 60 as N and its thickness as t, such a distance l may be expressed as follows:

$$l = t - t/N.$$

Thus, for $N = 1.5$, we have $l = t/3$. Therefore, if the angle $\alpha$ formed between the optical axis and the glass plate 60 is gradually made smaller from the point of limit where l is the shortest, we have the following relation $$l = t/3 \; \text{cosec} \; \alpha$$

which indicates that the point of interest g' may be continuously moved further away from the top surface of the contact glass plate 14a by making the angle $\alpha$ smaller.

Figure 18:
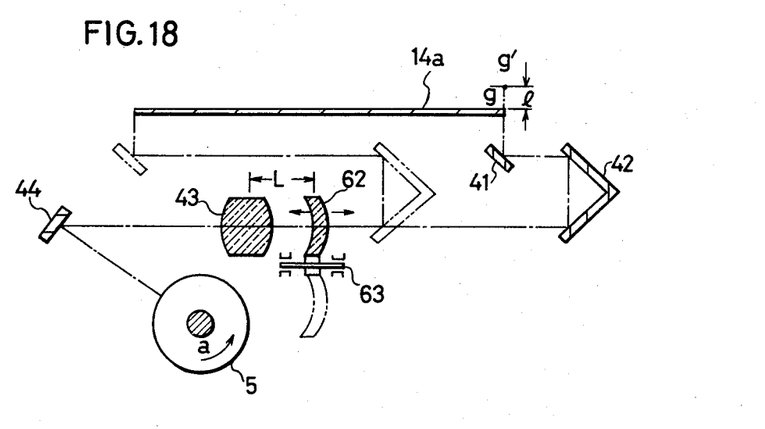
FIG. 18 is a schematic illustration showing a still further embodiment of the present invention having an adjustable optical system.

FIG. 18 shows a still further embodiment of the present invention in which there is provided an auxiliary lens 62 which is a concave lens having a relatively low power. The auxiliary lens 62 is fixedly mounted on a rotatable shaft 63 which is driven to rotate by any conventional means to bring the auxiliary lens 62 either into the operative position in the optical path in front of the lens 43 or into the inoperative position outside of the optical path, e.g., 180° rotated from the operative position. When located at the operative position, the auxiliary lens 62 cooperates with the lens 43 so that the focal point of such a lens combination is slightly moved further away as compared with the focal point of the lens 43 alone. In this embodiment, the major point position of the lens 43 is slightly changed due to the insertion of the auxiliary lens 62. However, depending upon the position of the focal point g' above the contact glass plate 14a or the design of the lens 43, such a change may be made as small as practically negligible.

It should further be noted that in the embodiment shown in FIG. 18, the auxiliary lens 62 may be moved along the optical path to change the distance l between the focal point g' and the contact glass plate 14a. In other words, letting the focal distance of the lens 43 to be $f_1$, the focal distance of the auxiliary lens 62 to be $f_2$, the gap between the lenses 43 and 62 to be L and the focal distance of the combined lens system to be f, we have the following equation among these parameters.

$$\frac{1}{f} = \frac{1}{f_1} + \frac{1}{f_2} - \frac{L}{f_1 \times f_2}$$

$f_1 > 0$
$f_2 < 0$

In the above equation, the first and second terms are constant and the third term, in effect, is positive in value because the lens 43 is a convex lens ($f_1 > 0$) but the auxiliary lens 62 is a concave lens ($f_2 < 0$). Therefore, if the auxiliary lens 62 is moved in such a manner to decrease the distance L between the two lenses 43 and 62, then the combined focal distance f can be made larger thereby allowing to increase the distance l between the focal point g' and the contact glass plate 14a. On the contrary, if the auxiliary lens 62 is moved farther away from the lens 43, the distance l can be made smaller.

As described in detail above, in accordance with the present invention, the focal point may be varingly set at an arbitrary point located above the contact glass plate as well as at the top surface thereof just by moving at least one element of the optical system, such as a lens, a mirror, a glass plate and an auxiliary lens, which influences the condition for image formation. The particular manner of such movement depends upon the nature of each element, e.g., its function, shape and relative positional relationship with the other elements. Accordingly, in accordance with the present invention, even such an original plane which can only be located at a certain distance above the top surface of the contact glass plate may be properly and clearly reproduced on a sheet of copy paper without causing deterioration of image quality or variation in amount of illuminating light.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An electrophotographic method for making a two-dimensional copy from a three-dimensional object, said method comprising the steps of:
    immersing said object into a quantity of transparent liquid contained in a container having a transparent bottom plate;
    bringing said object partly in contact with said bottom plate;
    exposing said object through said transparent bottom plate to a photosensitive member, by means of an optical system having a field of focal depth coincident with said object on said bottom plate;
    forming an electrostatic latent image of said object on said bottom plate on said photosensitive member; and
    developing said latent image to produce a two-dimensional image of said object on said photosensitive member.

2. The method of claim 1 wherein said three-dimensional object is an internal organ of a creature.

3. The method of claim 1 or 2 wherein said liquid includes water and/or formalin.

4. The method of claim 1 wherein said step of bringing said object includes placing a cover member having a white bottom surface on said object such that any part of the bottom surface of said cover member is submerged in said liquid.

5. The method of claim 4 wherein said cover member is a flexible sheet.

* * * * *